US012764020B2

(12) United States Patent
Jain et al.

(10) Patent No.: US 12,764,020 B2
(45) Date of Patent: Oct. 13, 2026

(54) CONVERGED SCALE-UP AND SCALE-OUT NETWORKS

(71) Applicant: MIPS Tech, LLC, San Jose, CA (US)

(72) Inventors: Prakash Jain, Fremont, CA (US); Durgesh Srivastava, Cupertino, CA (US)

(73) Assignee: MIPS Tech, LLC, San Jose, CA (US)

( * ) Notice: Subject to any disclaimer, the term of this patent is extended or adjusted under 35 U.S.C. 154(b) by 19 days.

(21) Appl. No.: 19/086,138

(22) Filed: Mar. 21, 2025

(65) Prior Publication Data

US 2026/0197234 A1 Jul. 9, 2026

Related U.S. Application Data

(60) Provisional application No. 63/742,990, filed on Jan. 8, 2025.

(51) Int. Cl.
*G06F 15/16* (2006.01)
*H04L 41/082* (2022.01)
*H04L 67/1001* (2022.01)

(52) U.S. Cl.
CPC ........ *H04L 41/082* (2013.01); *H04L 67/1001* (2022.05)

(58) Field of Classification Search
CPC .......................... H04L 41/082; H04L 67/1001
See application file for complete search history.

(56) References Cited

U.S. PATENT DOCUMENTS 10,069,751 B2 * 9/2018 Amulothu ............... H04L 47/70
11,494,692 B1 * 11/2022 Watkins .............. H04L 67/1089
12,495,090 B2 * 12/2025 Raju A ............... H04L 67/1095
2016/0026592 A1 * 1/2016 Ganth ................. G06F 9/45558 710/306
2017/0317887 A1 * 11/2017 Dwaraki ............. H04L 41/0859
2019/0068521 A1 * 2/2019 Kumar ................. B25J 15/0014
2021/0255979 A1 * 8/2021 Colenbrander ......... G06F 1/181
(Continued)

OTHER PUBLICATIONS

Khan et al., "Creating Custom Network Packet Processing Pipelines on HMC-Enabled FPGAs," Computer Science, Engineering, Published 2017, 2 pages.
(Continued)

*Primary Examiner* — Razu A Miah
(74) *Attorney, Agent, or Firm* — Ramakrishnan Parthasarathy; Hoffman Warnick LLC

(57) ABSTRACT

In one embodiment, a method includes registering, by a centralized controller of a backend network: (1) each compute node of the backend network, where each compute node has one or more AI accelerators and is in one of several distinct pods; (2) each scale-up switch of the backend network, where each scale-up switch is specific to a particular pod and connects compute nodes within its pod; and (3) each scale-out switch of the backend network. The method further includes dynamically determining, for an AI task, (1) whether to provide scale-up or scale-out resources for the task and then (2) a set of compute nodes to allocate to the task; generating, by a control plane, a data plane defining a data path for the allocated set of compute nodes; and performing, by the allocated set of compute nodes using the generated data plane, the particular AI task.

14 Claims, 6 Drawing Sheets

(56) References Cited

U.S. PATENT DOCUMENTS

| | | | | |
|---|---|---|---|---|
| 2023/0073931 | A1* | 3/2023 | Watkins .............. | H04L 67/1089 |
| 2023/0337018 | A1* | 10/2023 | Mehta ................... | H04W 24/04 |

OTHER PUBLICATIONS

U.S. Appl. No. 19/561,036, filed Mar. 9, 2026, 40 pages.
U.S. Appl. No. 19/548,689, filed Feb. 24, 2026, 46 pages.
U.S. Appl. No. 19/565,155, filed Mar. 12, 2026, 48 pages.

* cited by examiner

CONVERGED SCALE-UP AND SCALE-OUT NETWORKS

PRIORITY CLAIM

This application claims the benefit under 35 U.S.C. § 119 of U.S. Provisional Ser. No. 63/742,990, filed Jan. 8, 2025, which is incorporated by reference herein.

TECHNICAL FIELD

This application generally relates to converged scale-up and scale-out architectures.

BACKGROUND

Artificial intelligence (AI) tasks can require vast amounts of computing power. For instance, AI models such as machine learning (ML) models can have hundreds of millions of parameters, and training models of this size requires significant computing resources. As another example, inference tasks that need to be performed many times (e.g., for many users) likewise require a large amount of compute resources, as do certain natural-language processing tasks.

Compute resources for AI tasks include AI accelerators, which are hardware used to speed up AI. AI accelerators include graphics processing units (GPUs), as well as more specialized AI chips such as neural processing units or tensor processing units, etc. AI accelerators are often implemented as nodes, or clusters, that contain connected hardware such as one or more accelerators, a (typically relatively small) central processing unit (CPU), and a network interface, although clusters may be implemented with more or fewer components. Accelerator nodes are then deployed and used to perform AI tasks.

DESCRIPTION OF EXAMPLE EMBODIMENTS

Many users access a backend network to perform an AI task (including machine-learning tasks), such as model training or inference tasks. Users typically access the backend network through a front-end, user-facing network. The backend network contains many AI accelerators (such as GPUs, neural processing units, tensor processing units, etc.) that provide specialized compute resources for the compute-intensive AI tasks.

Figure 1:
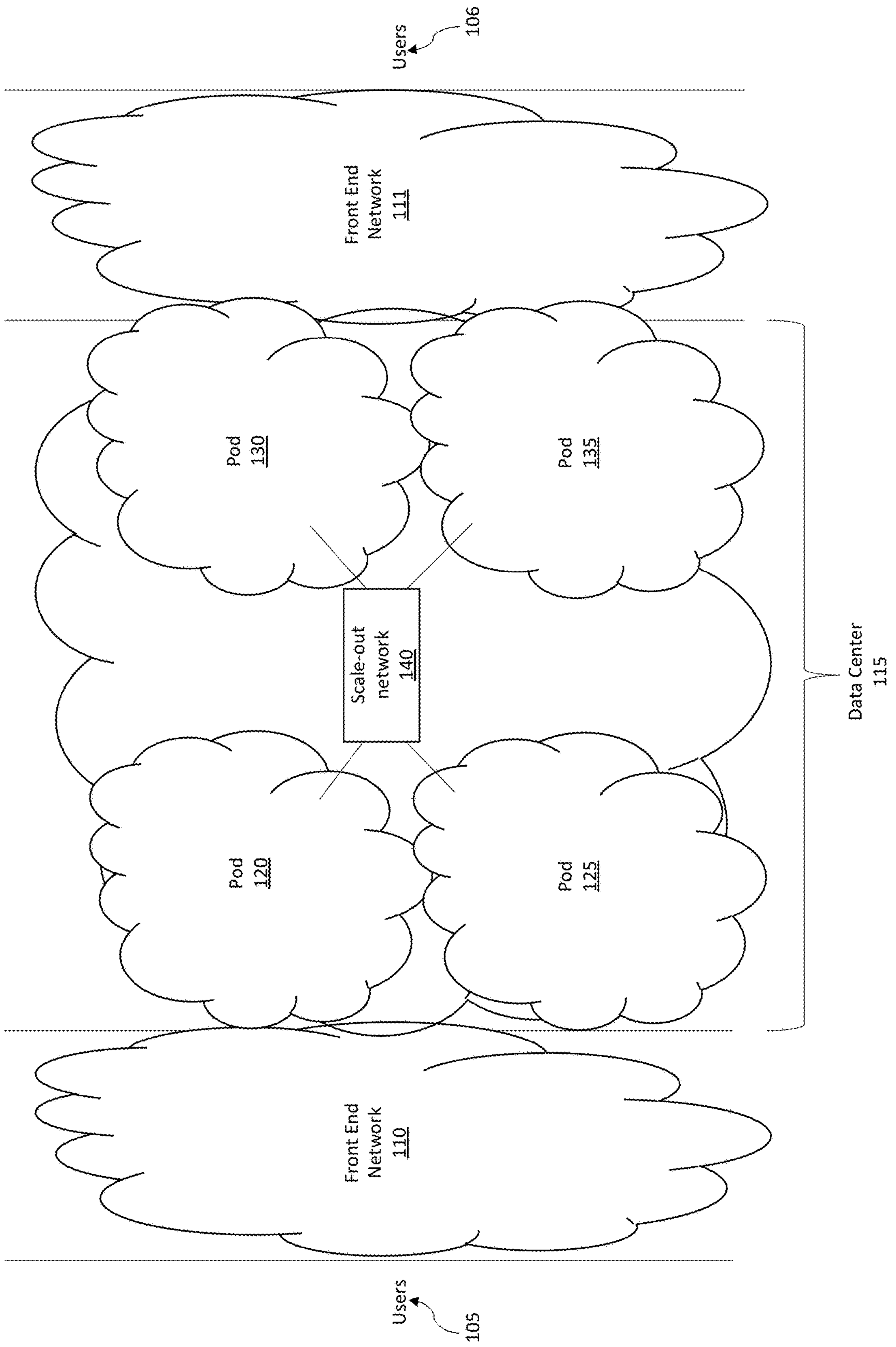
FIG. 1 illustrates an example end-to-end network.

In the example of FIG. 1, users 105 and 106 access data center 115 through front-end networks 110 and 111, respectively. Front-end networks 110 and 111 typically handle tasks that connect users, datasets, and services to data center 115's resources, such as AI accelerator resources. Front-end networks 110 and 111 may also perform one or more of dataset ingestion and preprocessing, model serving and inference requests, management and monitoring of traffic, and inter-service communication handling. The quality of service of front-end networks 110 and 111 adapt to the varied demands of AI tasks for users 105 and 106 while maintaining network flexibility and reliability. To that end, front-end networks 110 and 111 typically support flexible bandwidth allocation for traffic on their networks, provide burst traffic support (e.g., up to 10 times baseline speeds), provide TCP-IP optimization, and support multiple traffic classes (e.g., management, user data, and inference). In practice, a front-end network may serve tens, hundreds, or thousands of users or more, and provide connection to a data center that performs a requested AI task.

FIG. 1 illustrates that data center 115 provides service to users 105 and 106 through front-end networks 110 and 111, respectively. Back-end network 115, sometimes referred to as the AI accelerator fabric, supports high-performance inter-device communication for AI-driven tasks. Back-end network 115 supports the demands of distributed AI workloads, some of which are unique to the AI space, such as providing model training and inference. Back-end network 115 is typically responsible for distributed memory sharing, gradient aggregation for large language models, collective communications in multi-node AI training, managing RDMA (remote direct memory access) and RMA (direct load/store) operations requiring guaranteed delivery, and providing precise congestion control, among other things. Back-end network 115 provides quality-of-service specifications; for example, back-end network 115 may provide guaranteed bandwidth (e.g., approximately 400/800 Gbps per device); low latency (e.g., around 2 μs); lossless transmission; and predictable performance under loaded conditions.

In AI applications, data center 115 may handle very large amounts of data with a demanding quality of service. For example, training a single AI model that has, e.g., 175 billion parameters may utilize 1,024 GPUs (or more) and may include handling about 350 gigabytes of gradient data per training iteration while delivering deterministic latency and bandwidth to ensure synchronized performance between GPUs.

Data center 115 may be a physically centralized data center (i.e., the computational components of data center 115 may be geographically co-located) or may be a physically distributed data center (i.e. the computational components of data center 115 may be geographically dispersed, including spanning various physical buildings and server farms, etc.).

In order to optimize performance of AI tasks, backend network 115 is typically divided into two different, specialized segments: (1) a scale-up network and (2) a scale-out network. The scale-up network typically focuses on accelerator-to-accelerator communication within a computing pod (e.g., up to 1,024 accelerators) and leverages direct load/store memory access for ultra-low latency operations. The scale-out network typically facilitates communication across computing pods and clusters (e.g., connecting together thousands of accelerators) and utilizes RDMA for efficient data transfer across pods. In the example of FIG. 1, the scale-up network includes communication within each of pods 120, 125, 130, and 135. In other words, each pod includes multiple clusters of AI accelerators, and scaling up refers to the allocation of resources within a pod. In contrast, scaling out requires data transfer and coordination across pods and the clusters within those pods, tasks which are handled by scale out network 140 in the example of FIG. 1, which is a physically distributed network.

Separating a data center into scale-up and scale-out networks for AI tasks provides a number of benefits. For example, separating those two networks provides performance optimization, for example by reducing training time for large models, decreasing gradient synchronization latency, and eliminating performance variation in multi-tenant implementations. In addition, the separation can provide fixed or different packet sizes that are tailored for GPU/AI memory transfers, deterministic latency paths for predictable performance, and specialized congestion control algorithms for enhanced efficiency. Separating the two networks can also provide enhanced security, for example by physically isolating the two networks, having independent authentication domains and security policies, and controlling data flows to safeguard sensitive model training data of networks for improved security. Separating the two networks may also provide differentiated quality of service, for example by providing specialized quality-of-service treatment for scale-up traffic and for scale-out traffic as needed, by providing priority and credit-based congestion control mechanisms as needed, and by providing guaranteed bandwidth and zero packet loss for critical workloads.

While separating scale-up and scale-out networks provides many benefits, it also introduces certain drawbacks. For instance, the two networks use different communication protocols, and these protocols do not integrate from one network to another. For example, Ultra Accelerator Link (UAL) is a proposed short-range scale-up specification for communicating among accelerators within a pod, and Ultra Ethernet Consortium (UEC), in this context, is a proposed specification for communication among accelerators across pods. However, these two protocols are very different and do not interface with each other, and therefore AI tasks that require both scale-up and scale-out solutions cannot achieve seamless integration and management for both networks simultaneously.

Figure 2:
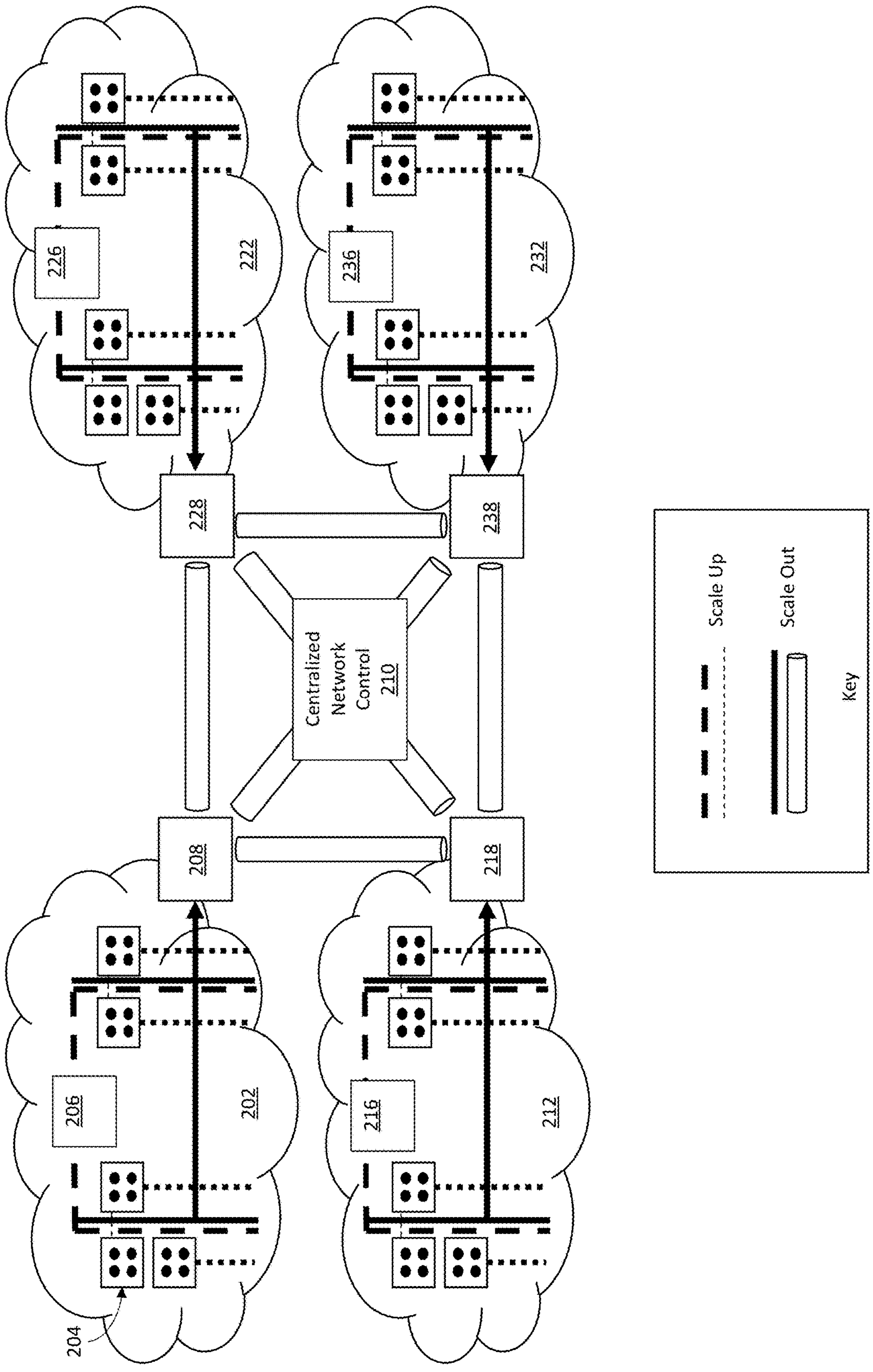
FIG. 2 illustrates an example converged architecture for scale-up and scale-out solutions.

In contrast, this disclosure describes a converged scale-up and scale-out architecture that provides users and AI tasks with both scale-up and scale-out services with a unified management infrastructure. FIG. 2 illustrates an example converged architecture 200 for scale-up and scale-out solutions. The example architecture of FIG. 2 functionally embodies three main components: (1) a controller-based optimized management and telemetry system; (2) a distributed AI infrastructure control plane system and (3) a converged AI infrastructure data plane system. Each of these components and their constituent architecture are described in more detail below.

The architecture of FIG. 2 includes multiple pods, e.g., pods 202, 212, 222, and 232. Each pod includes groups of clusters (or nodes), which are sets of one or more AI accelerators (e.g., GPUS) that typically include a processor and other computational components for that cluster. For example, pod 202 includes groups 204. The groups within a pod are connected to each other, either via a dedicated physical connection or through one or more scale-up switches 206 (serving pod 202), 216 (serving pod 212), 226 (serving pod 222), and 236 (serving pod 232), respectively, which as explained below, are used to add or remove particular accelerators or clusters in group from a scale-up network for a particular AI task. In particular embodiments, a pod may include one scale-up switch, but often a pod will include more than one such switches. In the example of FIG. 2, the scale-up network connections within a pod are illustrated by dashed lines.

Each pod also has one or more dedicated scale-out switches (e.g., switch 208, 218, 228, and 238), which connects clusters of groups for that switch's respective pod to a scale-out network for a particular AI task, i.e., facilitates the connection among groups across different pods. The scale-out network connections are illustrated in solid line in FIG. 2; this connection may, at the physical layer, be shared with the scale-out network in a particular pod, or may be a different physical connection. A physical layer connects scale-out switches 208, 218, 228, and 238 across pods and to centralized network control 210, which is described more fully below. This physical layer may be a UET (Ultra Ethernet Transport) fabric tunnel, although any suitable connection may be used.

In particular embodiments, a scale-out switch may be directly connected to the clusters of the pod it serves. In other embodiments, a scale-out switch may have a direct physical connection to only some of the clusters, and then may connect to the remaining clusters via one or more intermediaries, which may be networking/communication components within the directly connected clusters. Scale-up switches and scale-out switches may include ASICS, chiplets, or other suitable processing and networking components.

Each cluster, or node contains one or more (e.g., 4-5) AI accelerators. A pod may be formed by, e.g., 1 to 5 server racks, each of which contain several nodes and connect nodes together using a scale-up network (e.g., UAL). The physical connection and signaling protocol for scale-up network is quite fast, but the scale-up network is size limited; for instance, 1,024 accelerators is a typical a limit on the number of accelerators that can be connected together in a single scale-up network. These limits may be specified by the protocols used to define the scale-up network, and different protocols may set higher or lower accelerators limits. If an AI task requires more accelerators than the scale-up limit, then additional accelerators beyond this limit must be added using a scale-out solution.

Connections for the scale-out network are very different than for the scale-up network. One difference is the communication protocol used for scale-up and scale-out networks, as described above. Another difference is often proximity: scale-out networks can connect accelerators that are separated over very large distances, while the accelerators in a scale-up network are typically very closely co-located (for example, to permit very fast communication between those accelerators). For instance, a scale-out network may physically span hundreds of thousands of miles, connecting together accelerators in server racks that are physically separated by large distances.

The architecture and techniques described herein provide a converged scale-up and scale-out network that provides real-time, dynamically adjustable scale-up and scale-out services through an integrated management system. For example, suppose an AI task initially requires 900 accelerators. These requirements can be satisfied using a scale-up network only (i.e., using the scale-up infrastructure and protocols), without requiring scale-out network resources for that particular task. However, if the task demands increase (e.g., if the task involves inference on behalf of front-end users, and the user base grows) and more accelerators are devoted to the task than the scale-up accelerator limits allows, then both scale-up and scale-out networks will be required and can be dynamically created, allocated, and monitored for the task using the techniques described herein.

The controller-based optimized management and telemetry system provides a single pane of glass management across the entire backend infrastructure (i.e., for both scale-up and scale-out networks). This system provides reliability, availability, and serviceability (RAS) for the converged networks, and also provisions the network. The management plane is centralized entity, in the sense that the management plane has visibility into every node/cluster and switch in the network. Thus, each node and switch has some management plane functionality (e.g., to handle communications with the centralized management plane). However, the management plane may be geographically distributed or may be geographically centralized.

Figure 3:
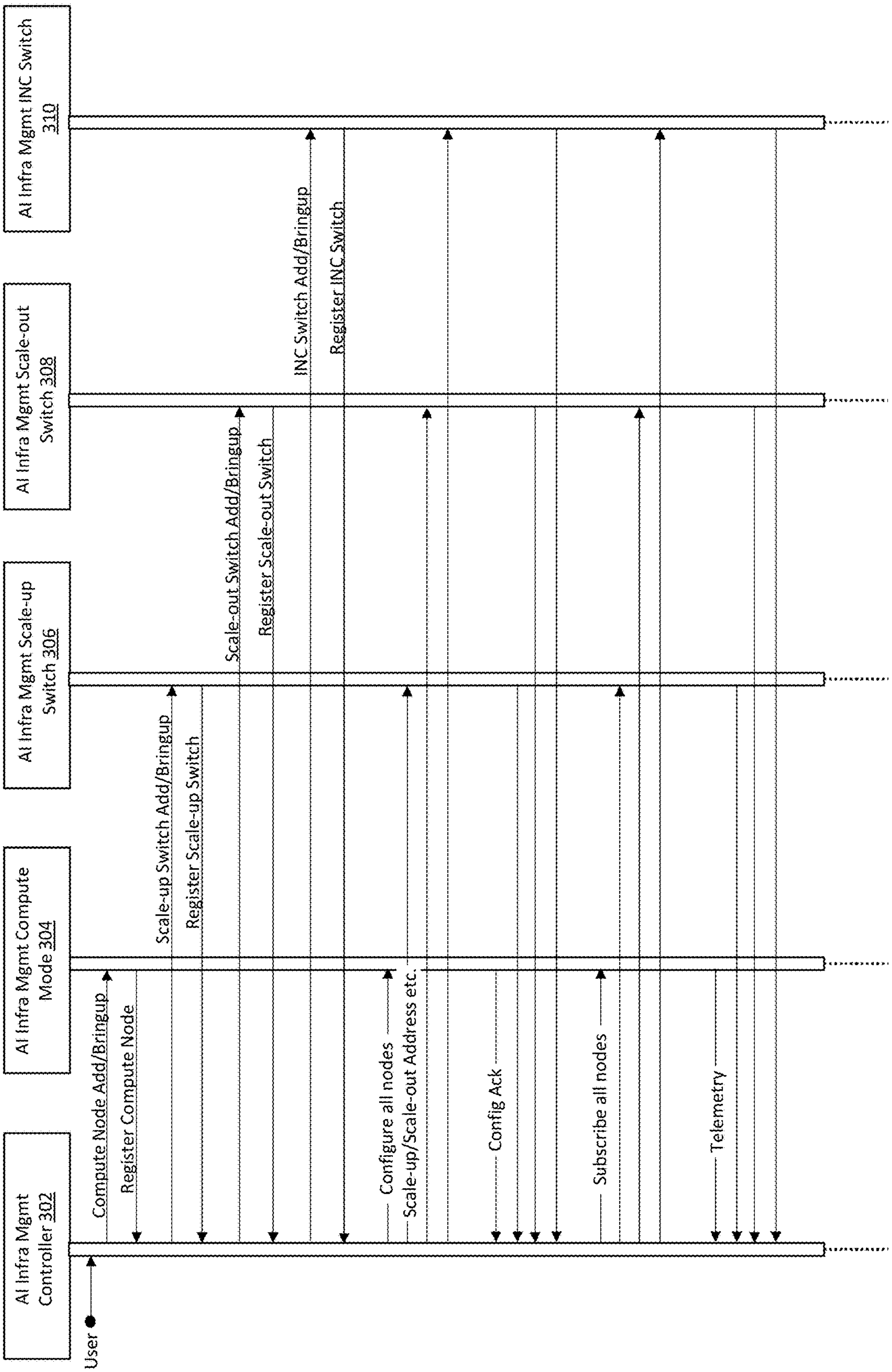
FIG. 3 illustrates an example implementation of a management plane.

FIG. 3 illustrates an example implementation of the management plane. In the example of FIG. 3, AI management controller 302 is the centralized-hosted entity that has access to, and can communicated with, every component in the scale-up and scale-out system. Each node communicates over the management plane with controller 302, which may be implemented by dedicated hardware (e.g., chips dedicated to the management tasks described herein) or may be implemented as software executing on physical resources. The physical resources implementing controller 302 may be co-located or may be distributed.

To provision a converged network, management controller 302 first communicates with each compute node 304 in the data center, which includes multiple pods. Controller 302 adds/brings up each node 304 to the converged system when the node 304 provides its responsive registration communication. In particular embodiments, management controller 304 may add every node in a data center, or may add a subset of nodes, which will then define the architecture available to the converged scale-up/scale-out network.

To add a compute node, controller 302 communicates (directly or indirectly, via an intermediary processing unit) with each AI management compute node 304. An agent in each compute node 304, often executing on that node's CPU, processes the communication request and transmits a registration confirmation from compute node 304 to controller 302 in order to provision that node to the converged network.

In a similar fashion, controller 302 provisions the full converged infrastructure by adding each management scale-up switch 306, each management scale-out switch 308, and each management INC switch 310. To do so, controller 302 (which again, may be implemented by a physically distributed architecture) communicates with each respective switch to add that switch, and that switch returns a registration communication to provision itself to the converged infrastructure.

The management-plane communication for each switch may be processed by a processor implemented with each switch. For instance, in the example of FIG. 2, each switch may directly process the request from controller 302. In other embodiments, intermediary components may be used; for instance, controller 302 may communicate with a chip that interfaces with multiple scale-up switches, and this chip may distribute management-plane requests and gather responses from each of the scale-up switches it serves and then communicate back to controller 302, obviating the need for direct communication between controller 302 and every switch in the data center. The important point is that the provisioning process performed by controller 302 does include a registration call to, and response from, each compute node and switch across the scale-up and scale-out infrastructures, so that controller 302 has a full, centralized view of the resources in that system. Each node and switch in the infrastructure has a management agent programmed (either in dedicated hardware or in software executing on a CPU) to process the respective registration calls and responses.

After registration, controller 302 configures each node and switch in the infrastructure, for instance by assigning that node or switch both a scale-up and scale-out networking address particular to the converged network. Particular embodiments may use a unified addressing scheme to make these address assignments, as described more fully below. Each node and switch returns (either directly to controller 302 or indirectly via an intermediary) an acknowledgment, at which point controller 302 subscribes each node and switch and then performs networking telemetry functions (e.g., acquires component health, availability, and usage data, etc., for example to gather information about crashes or errors in parts of the infrastructure). Once the converged infrastructure is provisioned and telemetry functions of controller 302 are occurring, then controller can dynamically allocate scale-up and scale-out resources for a particular AI task. This converged network is established by the control plane of the converged network.

Figure 4:
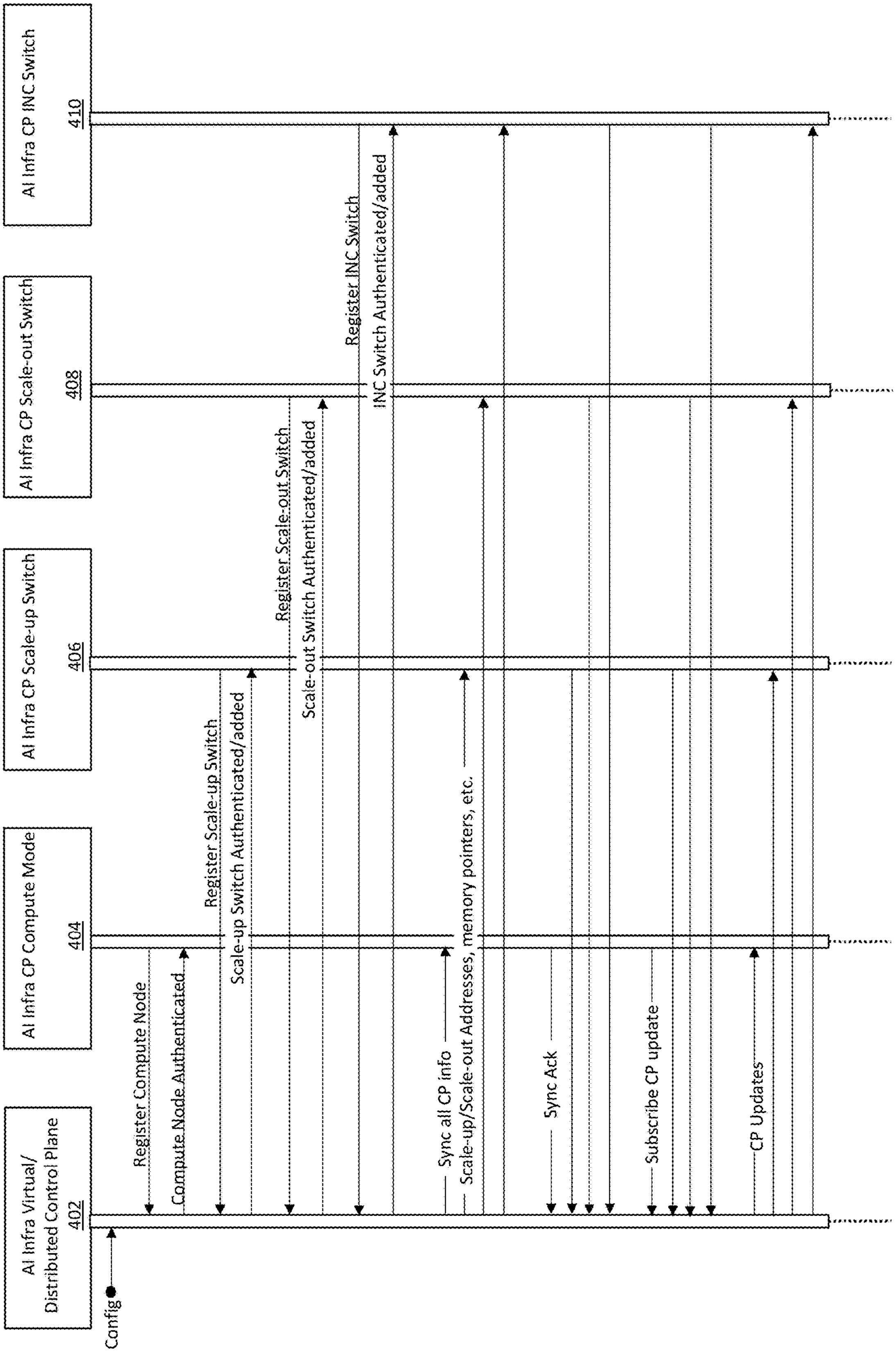
FIG. 4 illustrates an example implementation of a control plane.

FIG. 4 illustrates an example an example implementation of a control plane. The control plane serves to dynamically adjust the data plane, which as described below, defines the scale-up and scale-out physical resources and data path for each particular AI task at any given time. In contrast to the management plane, the control plane is dynamically defined, in that the control plane's registration of various nodes and switches is performed dynamically in order to establish a snapshot of the available network resources at a particular point in time. For example, some nodes in a pod may lose power or encounter errors, and the control plane dynamically detects which nodes and switches are available; from the control plane's perspective the current scale-up/scale-out network resources at a particular time are those management-plane resources that are available for utilization by AI tasks.

The example implementation of FIG. 4. illustrates a covered control plane that handles both scale-up and scale-out control plane tasks. For instance, the distributed control plane 402 configures and registers each available node 404, scale-up switch 406, scale-out switch 408, and INC switch 410. By being distributed, the converged control plane is able to perform at scale, i.e., when more nodes and server racks are added to the data center, then those resources can be dynamically registered with the control-plane network. In addition, the distributed nature of the control plane prevents a single point of failure.

The example of FIG. 4 illustrates a portion of the distributed control plane that is local to a particular pod. For instance, each local control plane registers the nodes and switches in its pod, and then communicates that information to centralized (in a networking sense, not necessarily a geographic sense) control plane components. The local control planes, along with any transit control planes, collectively define the global control plane.

Each node and switch includes control-plane functionality for processing communication with the control plane. For instance, each node's CPU (or other processing hardware) may execute the control-plane functions for that node. In particular embodiments, a control plane may share some resources with a management plane. For instance, a control plane may be implemented using the same centralized infrastructure implementing the management plane. However, the control plane needs to communicate faster than the management plane, and therefore the control plane's functions and agents are distinct from the management plane's functions and agents, even in embodiments in which these two planes may share physical execution resources.

The needs of a particular AI task are fulfilled by the control plane dynamically establishing the data plane for that particular task. For example, after each local control plane configures and registers its nodes and switches to the local control plane and communicates that information to the global control plane, then the data plane can be dynamically configured for each particular AI task. To do so, the control plane establishes the programming path from each compute node allocated to a particular task to each scale-up switch, and, if a scale-out network is required, from each scale-up switch to a corresponding scale-out switch, and from each scale-out switch to a corresponding INC switch, until the specific scale-up and scale-out demands for a particular AI task are met. The control path programs the data plane in each of these devices, forming a temporary converged network between these resources for the particular AI task.

Figure 5:
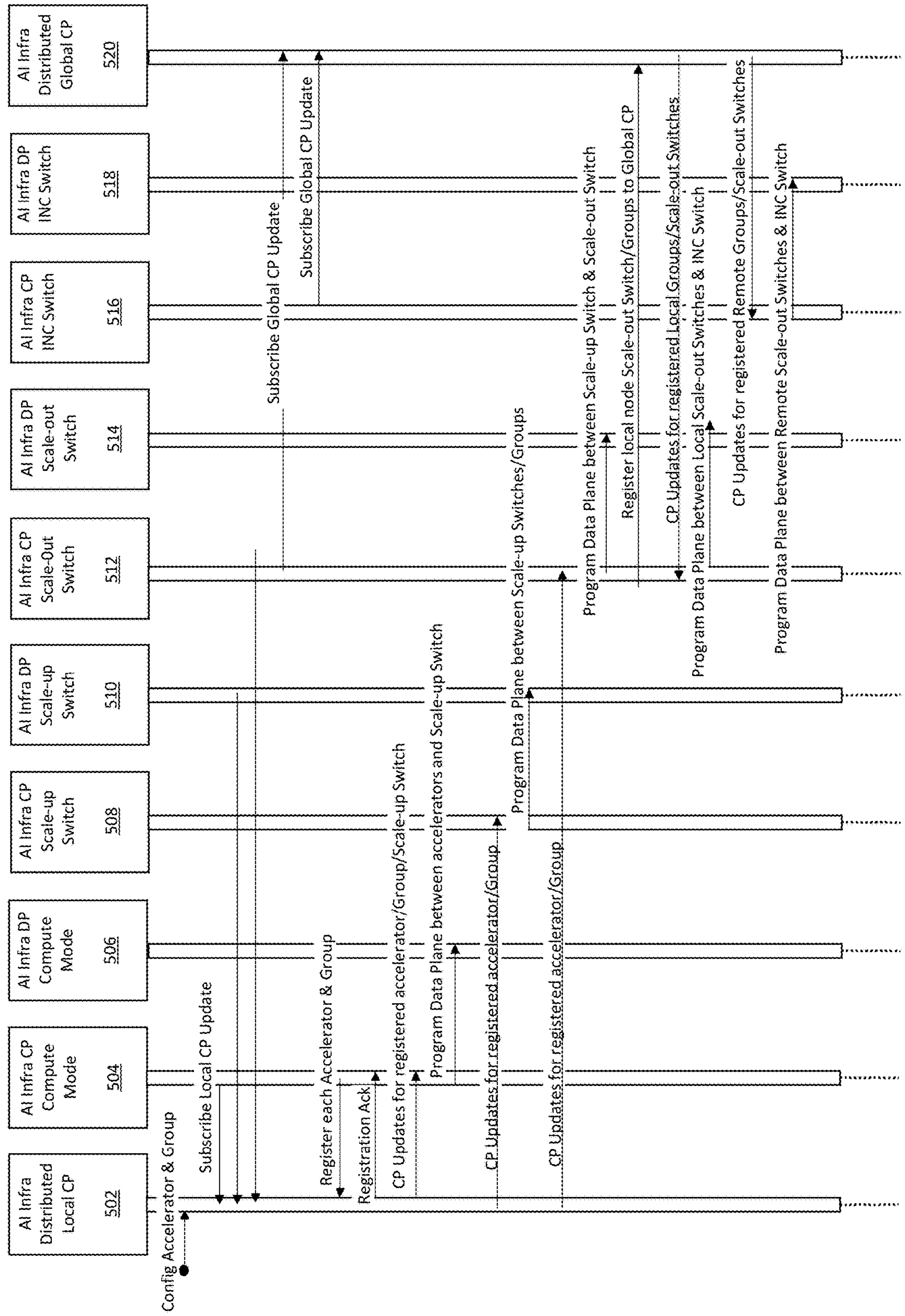
FIG. 5 illustrates an example implementation of a data plane.

FIG. 5 illustrates an example implementation of a data plane formed a control plane. Local control plane 502 receives the configuration for the particular AI task as it pertains to the pod or pods that local control plane 502 serves. The control plane functionality for each node 504, each scale-up switch 508, each scale-out switch 512, and each INC switch 516 subscribes to local control plane 502, for example to receive updates about the configuration changes to the data plane for a particular AI task.

In the example of FIG. 5, local control plane 502 programs the data plane between the scale-up nodes 506 and the scale-up switches 510, and also programs the data plane between groups of scale-up switches. Thus, the scale-up network for the particular task is generated by local control plane 502. For instance, suppose a task is allocated 1,800 accelerators: 1,000 from pod 1 and 800 from pod 2. Each pod's local control plane will program the data plane for its respective scale-up network, as described above. The intra-pod communication for each pod will then occur over the respective scale-up networks defined by the data path generated for that AI task.

In the example of FIG. 5, the control-plane functionality of scale-out switches 512 program the data plane 514 for the scale-out switches and register the local scale-out switch with the global control plane 520. The control-plane functionality of scale-out switches 512 also programs the data plane between local scale-out switches and an INC switch 518. The control-plane functionality 516 of the INC switch programs the data plane between the INC switch and remote scale-out switches. Once completed, the scale-up networks established by the respective local control planes and the scale-out network created by the scale-out and INC switches result in a converged, scale-up and scale-out network with assets that can be dynamically managed by the control plane in real time. For example, if more or fewer accelerators are needed by the demands of a particular task, then data plane for the affected scale-up and scale-out networks is dynamically reprogrammed, for example according to the example implementation illustrated in FIG. 5. In other words, the data plane for a particular AI task is dynamically managed by the control plane as the demands of the particular AI task change.

The INC switch refers to in-network computing, which is a centralized process that that receives data from each accelerator and then handles the resulting processing, so that each accelerator no longer needs to send its processing results to the other accelerators in order to fully process the AI task. Particular embodiments may use INC switches for in-network collectives by facilitating communication among many different accelerators of the converged scale-up and scale-out networks. All accelerators in the converged backend network can optimize data movement by using in-network collectives at the INC switches.

Particular embodiments may use a unified addressing scheme to handle addressing for both the scale up and scale out networks, using IPv4/IPv6 addresses. An IP address typically has two 2 parts: (1) subnet/network address bits and (2) host address bits. Particular embodiments herein may use the subnet/group bits of an IP address to refer to all the accelerators within a pod for the purposes of scale-out network addressing, and may use host bits of the IP address as the scale-up address of accelerators within each pod for purposes of scale-up network addressing. Thus, for each accelerator, the IP address (subnet bits and host bits) would be used to uniquely identify the address of that accelerator for scale-out purposes, while the host bits alone uniquely identify the accelerator within its own pod, i.e. for scale-up networking purposes. This unified addressing technique therefore provides each accelerator with a unique address for both scale out and scale up networks, even though scale up networks are usually not IP-based networks.

In particular embodiment, the subnet mask is configurable to allow flexibility regarding the maximum number of accelerators within a POD. The mask should be consistent for the entire backend network, and therefore should be predetermined as part of deployment planning before actual deployment.

Particular embodiments may use virtual network segmentation to provide security isolation across virtual networks, if required. Single or multiple subnet/group addresses can be part of one virtual network; however, each subnet would be unique across the backend network (i.e., there would be no overlapping addresses across VNs).

As a result of the techniques described herein, particular embodiments dynamically create and adjust a converged scale-up and scale-out network for an AI task as needed, and can efficiently direct traffic based on which network is implicated by the packet's address (i.e., which data plane, which part of the network, and which corresponding physical resources are implicated by a particular packet).

Figure 6:
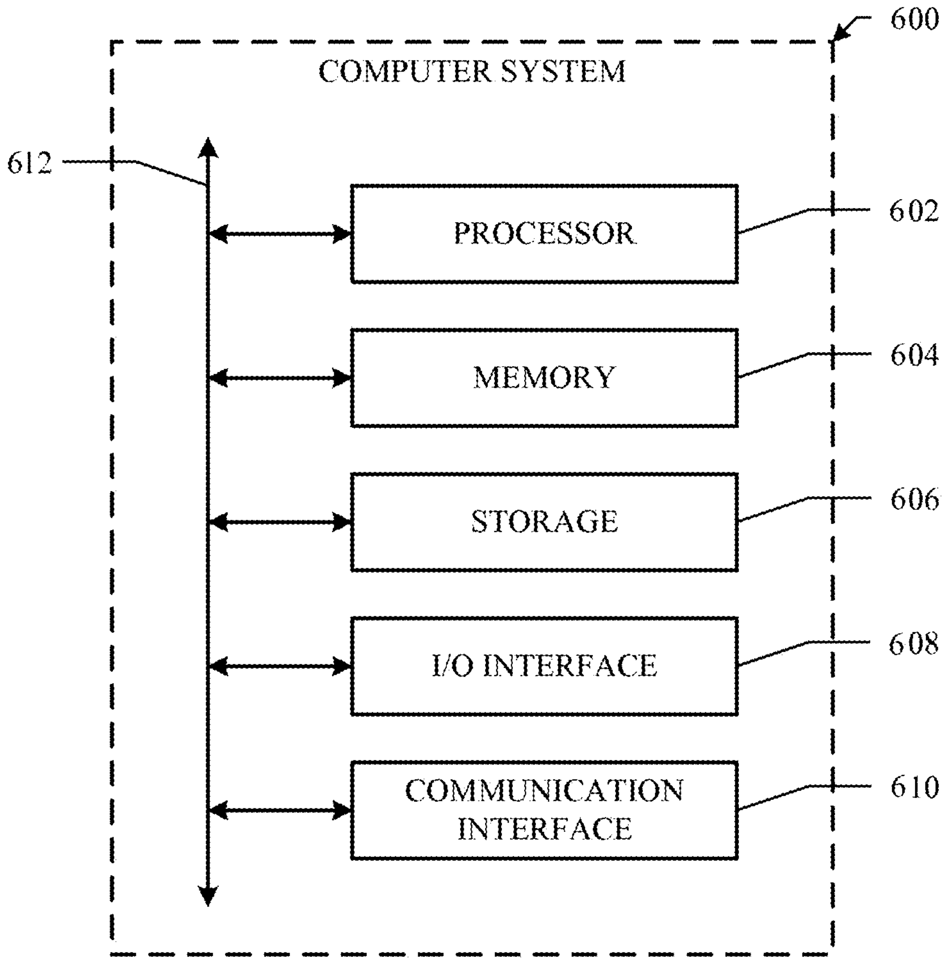
FIG. 6 illustrates an example computing system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

What is claimed is:

1. A method for creating and operating a converged scale-up and scale-out network infrastructure comprising:

registering, by a centralized controller of a backend network:

(1) each compute node of the backend network, each compute node comprising one or more Artificial Intelligence (AI) accelerators, and wherein each compute node is part of one of a plurality of distinct pods of the backend network;

(2) each scale-up switch of the backend network, wherein each scale-up switch is specific to a particular one of the plurality of pods and connects a plurality of compute nodes within its particular pod to each other; and (3) each scale-out switch of the backend network, wherein each scale-out switch is specific to a particular one of the plurality of pods and connects a plurality of compute nodes within its particular pod to the scale-out network outside the pod;

dynamically determining, for a particular AI task, (1) whether to provide scale-up or scale-out resources for the task and (2) based on the determination, a set of compute nodes of the backend network to allocate to the task;

generating, by a control plane, a data plane defining a data path for the allocated set of compute nodes;

performing, by the allocated set of compute nodes using the generated data plane, the particular AI task;

configuring, by the centralized controller, a unified address for each of the compute nodes, wherein the unified address comprises any of:

a subnet address identifying a scale-out address, wherein the subnet address is the same for each compute node in a particular pod; and a host address identifying a scale-up address, wherein the host address is different for each compute node in the particular pod.

2. The method of claim 1, wherein the scale-up network comprises an Ultra Accelerator Link (UAL) scale-up network.

3. The method of claim 1, wherein the scale-out network comprises an Ultra Ethernet Consortium (UEC) network.

4. The method of claim 1, wherein the unified address comprises an Internet Protocol (IP) address.

5. The method of claim 1, wherein each compute node comprises a centralized controller agent, a control-plane agent, and a data-plane agent.

6. The method of claim 1, wherein the AI accelerator comprises a graphics processing unit (GPU).

7. A system comprising a converged scale-up and scale-out network, comprising:

a centralized controller comprising one or more processors operable to:

register each compute node of the backend network, each compute node comprising one or more Artificial Intelligence (AI) accelerators, and wherein each compute node is part of one of a plurality of distinct pods of the backend network;

register each scale-up switch of the backend network, wherein each scale-up switch is specific to a particular one of the plurality of pods and connects a plurality of compute nodes within its particular pod to each other;

register each scale-out switch of the backend network, wherein each scale-out switch is specific to a particular one of the plurality of pods and connects a plurality of compute nodes within its particular pod to the scale-out network outside the pod; and dynamically determine, for a particular AI task, (1) whether to provide scale-up or scale-out resources for the task and (2) based on the determination, a set of compute nodes of the backend network to allocate to the task;

a control plane comprising one or more processors coupled to a memory to generate a data plane defining a data path for the allocated set of compute nodes; and the data plane, comprising (1) the allocated set of compute nodes (2) one or more corresponding scale-up switches and (3) one or more corresponding scale-out switches, the data plane configured to perform the particular AI task, wherein the one or more processors of the centralized controller are further configured to configure a unified address for each of the compute nodes, wherein the unified address comprises any of:

a subnet address identifying a scale-out address, wherein the subnet address is the same for each compute node in a particular pod; and a host address identifying a scale-up address, wherein the host address is different for each compute node in the particular pod.

8. The system of claim 7, wherein the scale-up network comprises an Ultra Accelerator Link (UAL) scale-up network.

9. The system of claim 7, wherein the scale-out network comprises an Ultra Ethernet Consortium (UEC) network.

10. The system of claim 7, wherein the unified address comprises an Internet Protocol (IP) address.

11. The system of claim 7, wherein the AI accelerator comprises a graphics processing unit (GPU).

12. The system of claim 7, wherein the centralized controller is geographically distributed.

13. The system of claim 7, further comprising one or more INC switches configured to aggregate AI-task communication between compute nodes in different pods.

14. The system of claim 7, wherein the control plane comprises one or more processors executing a control-plane agent in each of (1) the compute nodes (2) the scale-up switches and (3) the scale-out switches.

* * * * *